Nov. 25, 1930.  J. T. COMPTON  1,782,646
GROUND SCRAPER AND LEVELER
Original Filed April 25, 1928   6 Sheets-Sheet 2

Inventor:
James T. Compton
By R. S. Burry
Atty.

Patented Nov. 25, 1930

1,782,646

UNITED STATES PATENT OFFICE

JAMES T. COMPTON, OF LOS ANGELES, CALIFORNIA

GROUND SCRAPER AND LEVELER

Application filed April 25, 1928, Serial No. 272,741. Renewed August 4, 1930.

This invention relates to a ground scraping and leveling machine of the shovel type, and has as its primary object the provision of an implement which is operable while being advanced over the ground surface to scrape and remove the surface material, to collect and convey the removed materials, to dump the accumulated load of materials, to effect a leveling action, and to be restored to a normal position.

Another object is to provide a mechanism of the above character in which the several operations may be manually controlled by an operator located at a remote point in advance of the implement whereby it is adapted to be towed over the ground surface by means of a motor vehicle, such as a tractor, and be controlled entirely by an operator on the vehicle.

Another object is to provide a means whereby the several operations of the implement may be controlled by pull cords.

Another object is to provide an effective means whereby the depth of cut or penetration of the cutting edge of the scraper may be varied and readily regulated during its operation.

Another object is to provide a trip controlled mechanism whereby the scraper may be automatically tilted to effect discharge of its contents, together with means for supporting and maintaining the scraper in its tilted position so that it will then serve as a leveler, and embodying means for adjusting the extent of tilt of the scraper to various positions.

Another object is to provide a construction and arrangement of the controlling mechanism such that obstructions on the ground surface can not cause accidental operation thereof.

Another object is to provide the scraper with a control mechanism whereby it may be operated with great accuracy and the loads picked up and deposited where desired.

Another object is to provide a manually controlled means operable by tractional engagement with the ground surface during advance of the implement thereover for automatically restoring the tilted scraper to its normal position whereby the trip controlled mechanism above referred to will be reset in readiness for another operation.

Another object is to provide the implement with a draft appliance whereby the pull applied to the scraper in effecting its advance will be imparted thereto both to the upper and lower portions thereof while the scraper is in either its loading, dumping or leveling positions.

A further object is to provide an implement of the above character which is especially applicable for use in heavy duty service, whereby the working of extensive surface areas and the handling of comparatively large quantities of materials will be facilitated, and speedily and economically effected.

With the foregoing objects in view, together with such other objects and advantages as may subsequently appear, the invention resides in the features, and in the parts and combination, construction and arrangement of parts hereinafter described and claimed, and illustrated by way of example in the accompanying drawings, in which:

Referring to the drawings more specifically, A indicates generally the scraper body which comprises a bottom wall 20, a back wall 21 formed in continuation of the bottom wall 20, end walls 22 and 23, a gusset plate 24 intermediate the end walls extending between the bottom and back walls, and a scraper blade 25 extending along the forward edge of the bottom wall. Projecting forwardly and upwardly from the upper edge of the back wall 21 is a bracket 26 having a downturned rear end portion 27 abutting against the rear face of the back wall 21 and fixedly secured to the latter. This bracket constitutes an element of a draft appliance including a tongue B, and affords a connection between the tongue and the rear upper portion of the scraper body intermediate the ends thereof. The forward end of the bracket 26 is pivotally connected by a pivot pin 28 to a pair of parallel links 29 and 30 which project forwardly on opposite sides of the tongue and constitute side members of a carriage C slidably supported and guided on the tongue B. The forward end of the tongue is fitted with an eyelet 31 for connection with a vehicle or other means for drawing the implement. The tongue embodies a pair of vertically spaced parallel bars 32 and 33 connected together at their ends; a space $a$ being formed between the bars to constitute a guideway.

Figures 9, 10, 11, 12:
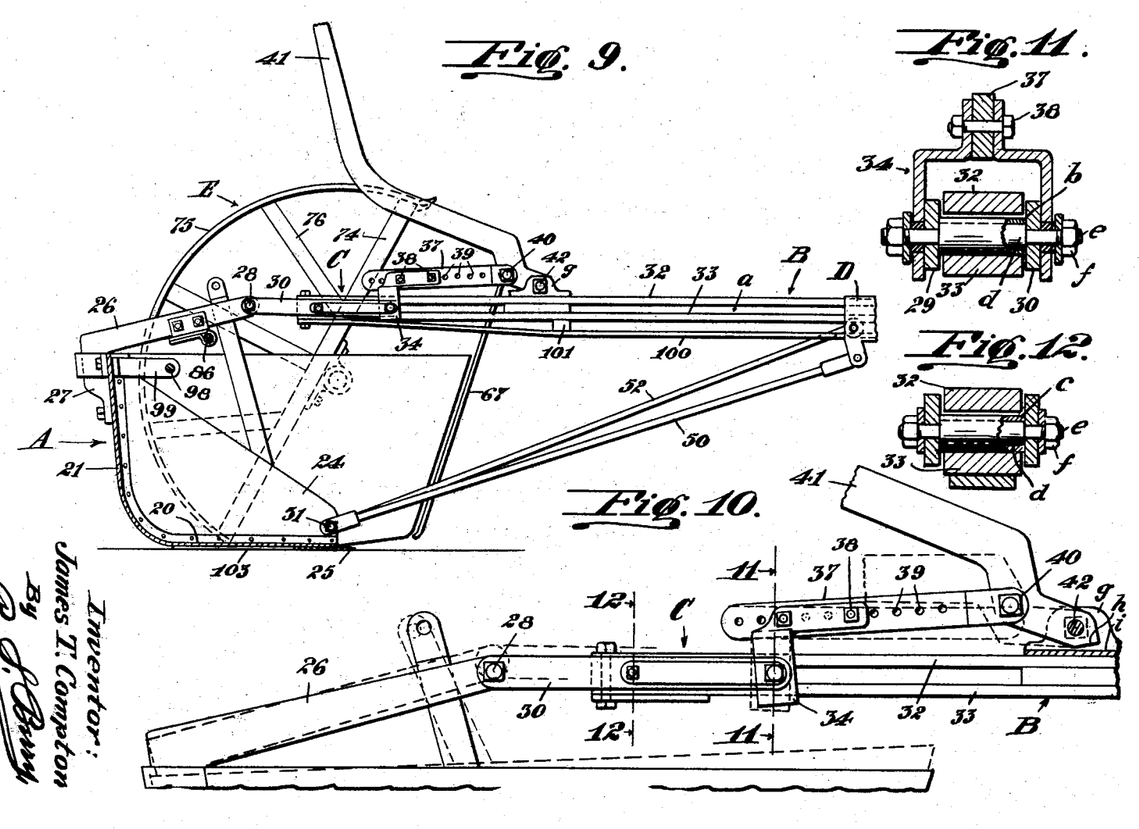
Fig. 9 is a detail in section as viewed on the line 9—9 of Fig. 5 with parts removed showing the implement as disposed in its surface scraping and loading position.
Fig. 10 is a detail in side elevation illustrating the construction and operation of the mechanism for controlling the scraping and loading operations.
Fig. 11 is a view in section as seen on the line 11—11 of Fig. 10.
Fig. 12 is a view in section taken on the line 12—12 of Fig. 10.

The carriage C embodies a pair of rollers $b$ and $c$ as shown in Figs. 11 and 12, which are supported on the links 29 and 30 in spaced relation to each other and project into the space $a$ between the bars 32 and 33; the rollers embodying sleeves turnably mounted on stub shafts $d$ having reduced threaded end portions $e$ which project through the links and are engaged by nuts $f$. The reduced end portions of the stub shaft carrying the roller $b$ pivotally connect with a yoke 34 which extends astride and projects above the tongue B and is rigidly and adjustably secured to an arm 37 by means of a pair of bolts 38 engaging certain of a series of holes 39 in the arm. The arm 37 projects substantially parallel with the top bar 32 of the tongue and its forward end is pivotally connected by a pivot pin 40 with an operating lever 41, one end of which is pivoted at 42 to ears $g$ on the tongue B and the other end portion of which projects horizontally and then upwardly and is connected with a forwardly leading pull cord 43. The lever 41 and its connections with the scraper body through the arm 37 and carriage C serves as a means for enabling manual rocking of the scraper from its normal position to its scraping position and to regulate the extent of penetration of the scraper blade in the surface materials being worked, as will be later described.

The pivotal connection 40 of the arm 37 with the lever 41 is located between the pivotal mounting 42 of the lever 41 and the connection between the outer end of the arm and the carriage C so that this arm and the portion of the lever extending between the pivots 40 and 42 serve as a toggle, which when the parts are disposed in the normal position as indicated in dotted lines in Fig. 12 will serve to lock the upper rear portion of the scraper body against forward movement relatively to the scraper edge portion thereof under the urge of forces directed rearwardly against the cutting edge of the scraper. The lever 41 in being formed with the horizontal portion projecting rearwardly above the arm 37 will normally gravitate to this normal locking position and accordingly will automatically return to normal after having been rocked upwardly and forwardly on release of the pull thereon. As a means for limiting the forward rocking movement of the lever 41, the lower end thereof is formed with a projection $h$ as shown in Fig.

10, which is adapted to strike a wall $i$ connecting the ears $g$, and thereby serve a stop.

Mounted for movement longitudinally of the tongue B is a carriage D embodying side plates 44 and 45 extending on opposite sides of the tongue and including a pair of rollers 46 and 47 revolubly supported on the plates and extending between the members 32 and 33 of the tongue whereby the carriage is supported and guided on the tongue. The rollers 46 and 47 each consist of a sleeve $j$ revolubly mounted on a stub shaft $k$ having reduced threaded end portions $l$ which project through the plates 44 and 45 and are engaged by nuts $m$.

Figures 13, 14, 15, 16, 17:
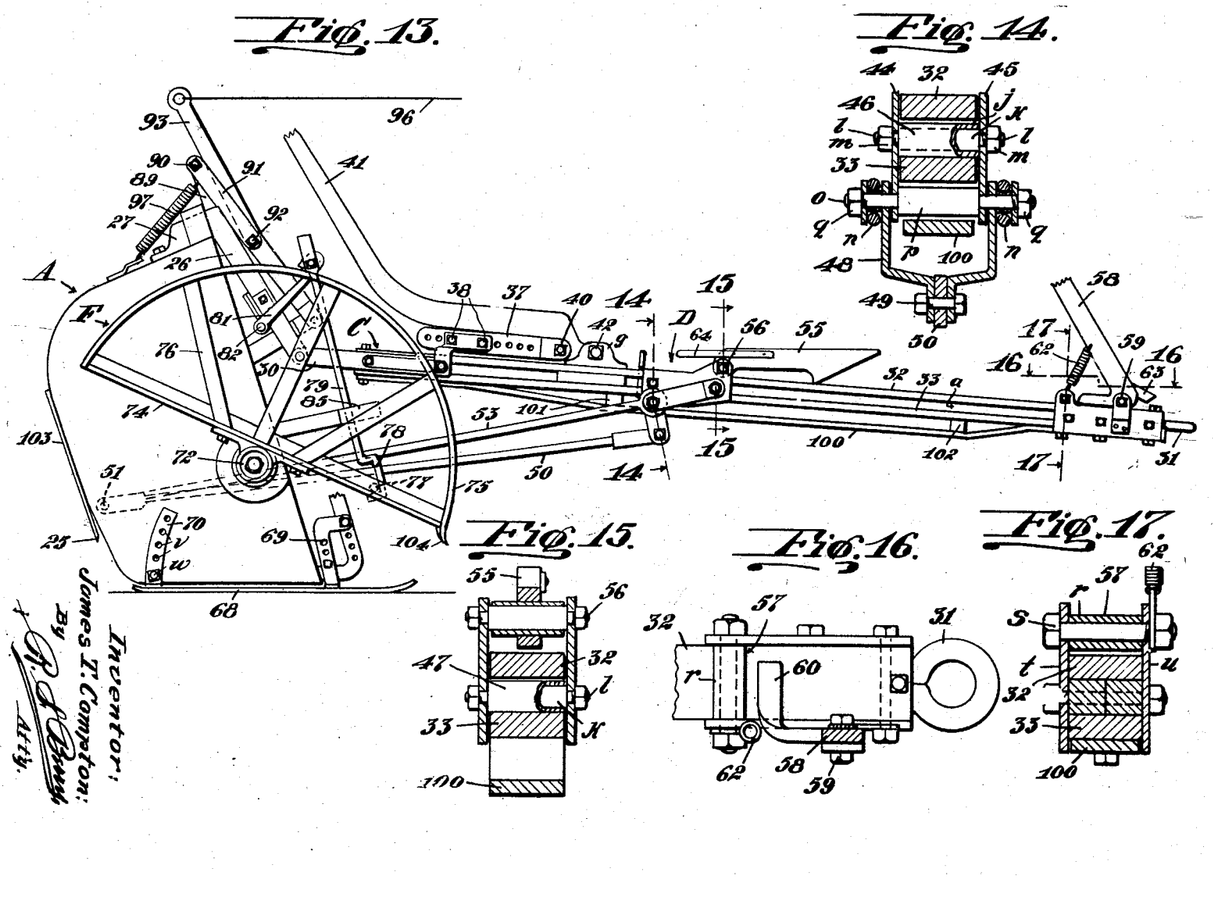
Fig. 13 is a view of the implement as seen in side elevation showing it with the parts as disposed in the dumping and leveling position.
Fig. 14 is a view in section taken on the line 14—14 of Fig. 13.
Fig. 15 is a view in section as seen on the line 15—15 of Fig. 13.
Fig. 16 is a horizontal section and plan view as seen on the line 16—16 of Fig. 13.
Fig. 17 is a detail in section as seen on the line 17—17 of Fig. 13.

Projecting downwardly from one end of the carriage D is a yoke 48 to which is pivotally attached at 49, a draw bar 50 which extends rearwardly and connects with the forward bottom portion of the scraper intermediate the ends of the latter; the draw bar being here shown as pivoted at 51 to the gusset plate 24. The draw bar 50 thus affords a connection between the central forward portion of the scraper and the carriage D. Extending downwardly and diagonally from opposite sides of the carriage D is a pair of draw bars 52 and 53, which pivotally connect with the lower forward portion of the scraper body adjacent the ends thereof, being here shown as pivotally attached to the end walls of the scraper at points alined with the pivotal connection 51 of the draw bar 50 as indicated at 54; the upper ends of the draw bars being formed with loops $n$ which are pivotally engaged with pivot pins $o$ formed on a spreader bar $p$ extending between the plates 44 and 45 beneath the tongue member 33 as shown in Fig. 14. Nuts $q$ screwed on the pins $o$ serve to hold the loops $n$ in place on the pins on the plate.

Figures 1, 2, 3, 4:
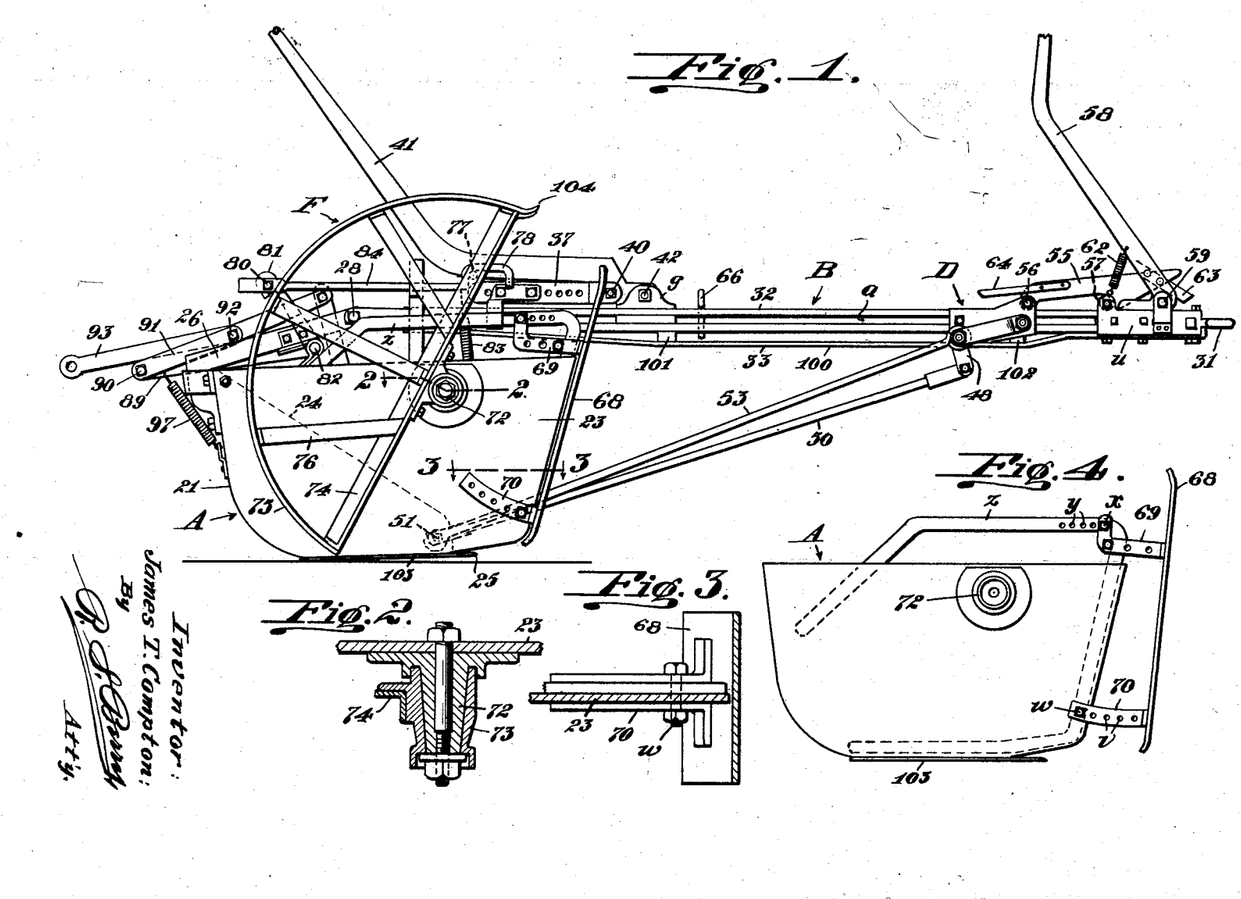
Fig. 1 is a view of the implement as seen in side elevation showing it in its normal position.
Fig. 2 is a detail in section taken on the line 2—2 of Fig. 1, showing the trunnion construction.
Fig. 3 is a detail in section taken on the line 3—3 of Fig. 1.
Fig. 4 is a view in side elevation of the scraper body with parts removed, showing the manner of adjusting the runners in regulating the extent of lift of the scraper body in the dumping operation.
Figures 5, 6, 7, 8:
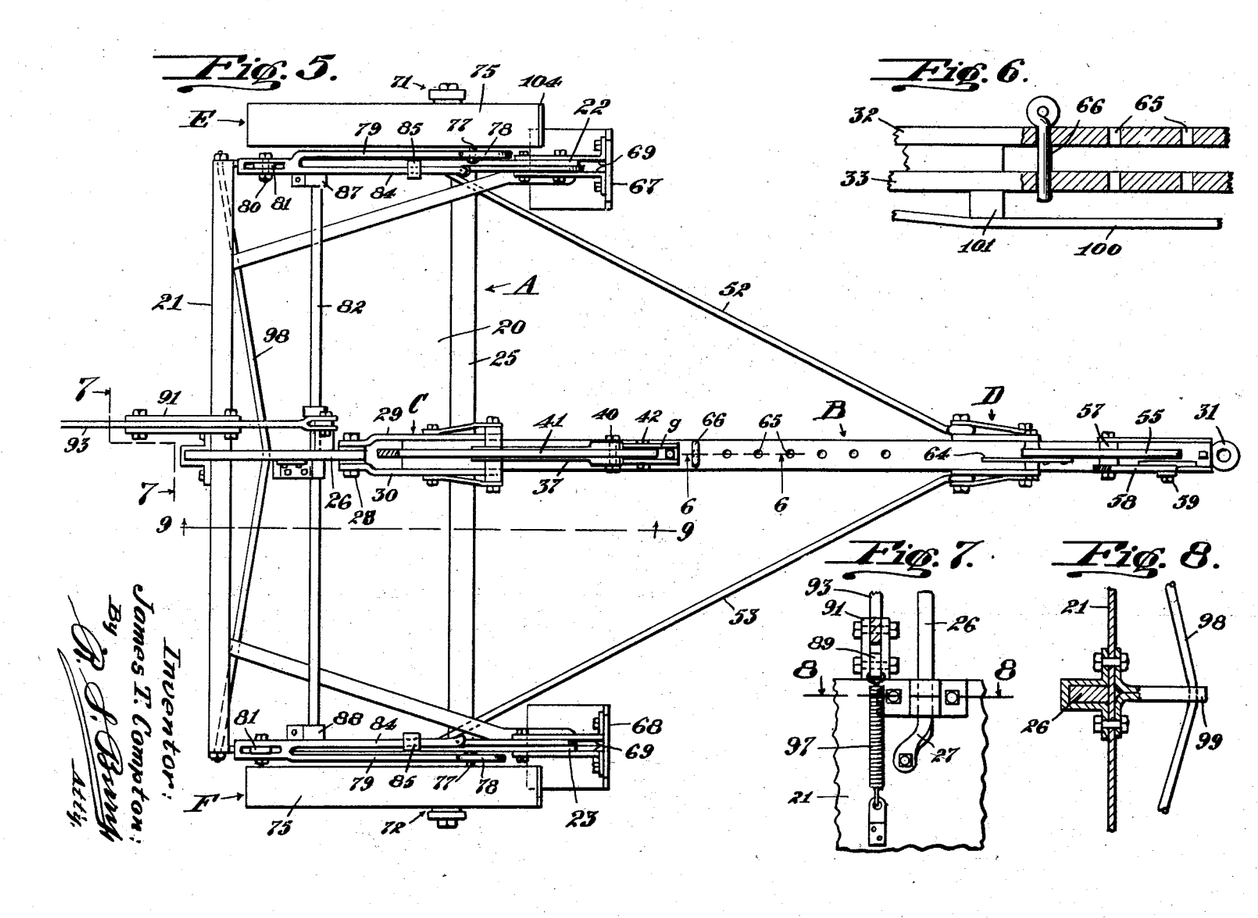
Fig. 5 is a plan view of the implement with the parts disposed as shown in Fig. 1.
Fig. 6 is a detail in section and elevation taken on the line 6—6 of Fig. 5.
Fig. 7 is a detail in section and elevation as seen on the line 7—7 of Fig. 5 in the direction indicated by the arrows.
Fig. 8 is a detail in horizontal section taken on the line 8—8 of Fig. 7.

As a means for holding the carriage D in its forwardmost position on the tongue B, a pawl or hook 55 is pivoted at 56 on the carriage D and arranged to project forwardly thereof above the tongue, and the forward end portion of the tongue is provided with a keeper 57 with which the pawl 55 is engageable. The keeper 57 embodies a hardened steel sleeve $r$ extending transversely across the upper member 32 of the tongue and revolubly carried on a bolt $s$ supported on side plates $t$ and $u$ fixedly attached to the forward end portion of the tongue as shown in the Figs. 16 and 17. When the carriage D is disposed in its forwardmost position, the scraper body A will be disposed in its normal position as shown in Fig. 1, that is with the forward portion of the bottom wall of the scraper inclined upwardly to elevate the scraper blade 25. When the carriage C is advanced as before described, the scraper body will pivot on its connections with the draw bars.

The pawl 55 is disengaged from the keeper 57 when it is desired to effect tilting of the scraper body while the implement is advancing, so as to permit the carriage D to move rearwardly on the tongue and allow the scraper body to swing rearwardly and upwardly. For this purpose, an upstanding bell-crank lever 58 is pivoted at 59 on the upper forward end portion of the tongue and is formed on its short arm with a finger 60 arranged to project beneath the outer end portion of the pawl 55 in such manner that on rocking the upper end portion of the lever 58 forwardly, the finger 60 will raise the pawl 55 out of engagement with the keeper 57. The upper end of the lever 58 connects with a forwardly leading pull cord 61. A spring 62 connected to the lever 58 acts to normally maintain the latter in a retracted position. As a means for limiting forward movement of the lever 58, the lower end portion thereof is provided with a projection 63 adapted to strike the tongue B when the lever 58 has been advanced sufficiently to disengage the pawl 55; and as a means for limiting upward movement of the pawl, the latter is fitted with a rearward extension 64 arranged to strike the upper face of the tongue when the pawl is swung upward sufficiently to clear the keeper 57. The bars 32 and 33 of the tongue are formed with aligned openings 65 to receive a pin 66 to afford an abutment which will serve as a means for limiting rearward movement of the carriage D and for determining the extent of tilting of the scraper body.

As a means for affording a substantial support for the scraper body, when the latter is tilted, a pair of runners or shoes 67 and 68 are mounted to extend longitudinally in front of the forward edges of the side walls 22 and 23; the runners embodying plates which project beyond the upper ends of the walls 22 and 23 and are slightly curved at their outer end portions. The runners are secured in place by means of brackets 69 and 70 adapted to be adjusted at various positions to vary the longitudinal inclination of the runners relatively to the front ends of the scraper end walls and also to space the runners at various positions relatively to the front edges of the scraper end walls according to the extent of elevation of the scraper desired. For this purpose the bracket 70 is formed with a series of spaced openings $v$ for engagement by a bolt $w$ on the scraper end wall and the upper bracket 69 is engaged by a bolt with any one of a series of openings $y$ formed in bars $z$ carried by the scraper end walls and projecting above and substantially parallel with the upper edges of the latter as particularly shown in Fig. 4.

Projecting outwardly from the upper portions of the end walls 22 and 23 are trunnions 71 and 72 on which are revolubly mounted half-wheels E and F respectively, each of which embodies a hub 73 supported on the trunnion to which hub and angle-iron bar 74 is affixed intermediate its ends, and also includes a semi-circular rim 75, the ends of which are affixed to the terminals of the bar 74; spokes 76 affording a further connection between the rim and the bar.

Figures 18, 19, 20:
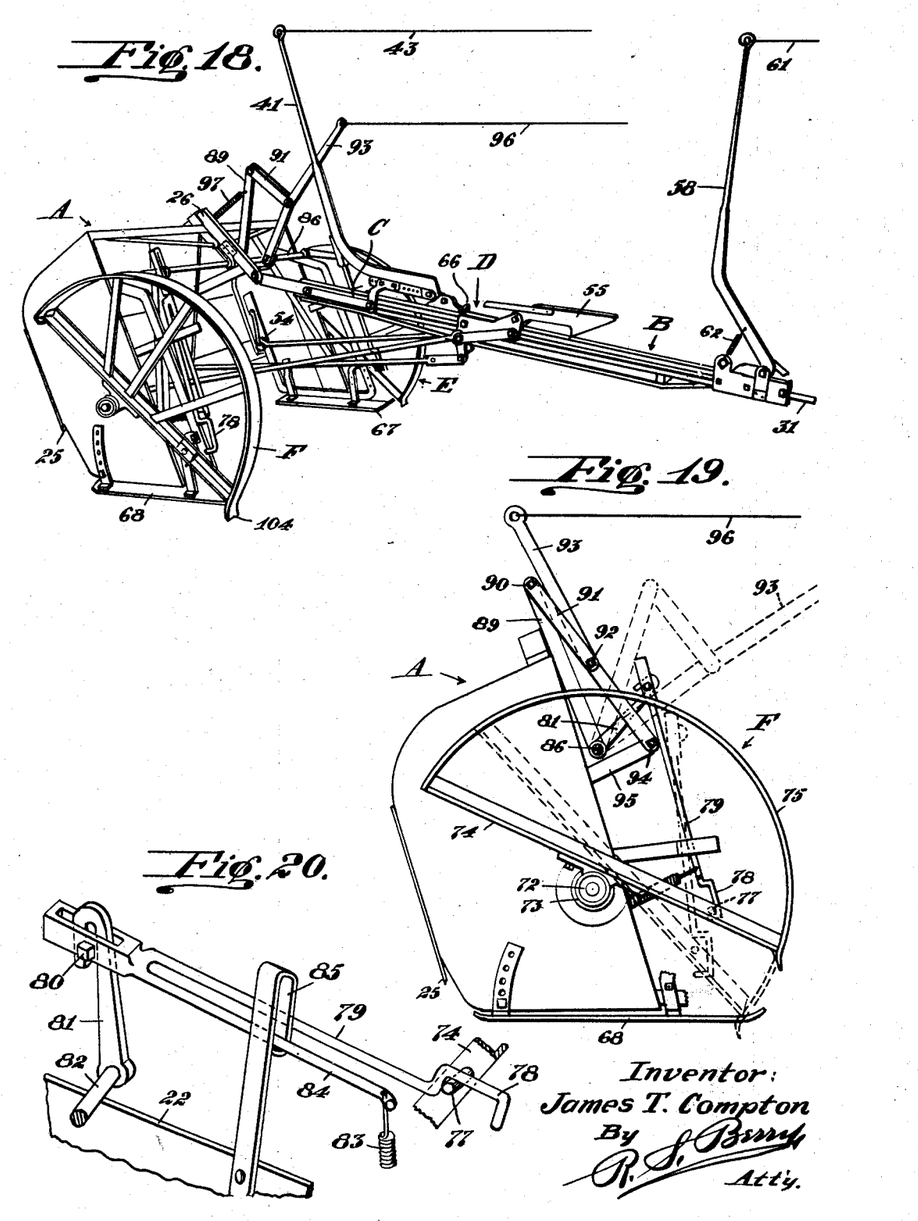
Fig. 18 is a perspective view of the implement showing the scraper in the leveling position with the parts as initially disposed in effecting automatic restoration of the implement to the normal position.
Fig. 19 is a detail in side elevation with portions removed and illustrating the restoring mechanism and the mode of operation thereof.
Fig. 20 is a detail in perspective of a portion of the control mechanism governing the restoration of the scraper body to its normal position.
Figures 21, 22, 23, 24:
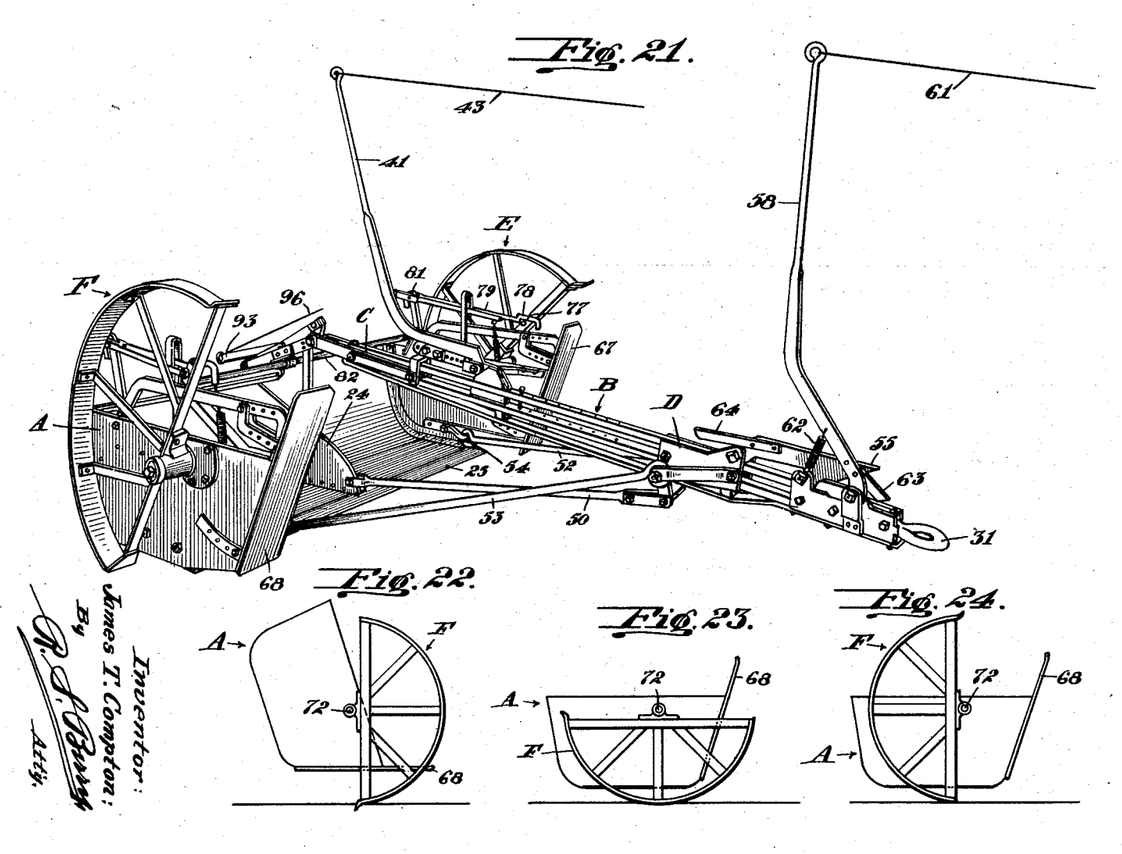
Fig. 21 is a perspective view of the implement as seen from the front thereof, showing it as disposed in its normal position.
Figs. 22, 23, and 24 are diagrammatic views showing the operation of the restoring mechanism.

The half-wheels E and F are normally held against rotation and for this purpose, a pin 77 projecting inwardly from the bar 74 on each half-wheel is engaged by a hook 78 formed on the forward end of a stem 79 pivotally supported at its rear end by a pin 80 on a crank arm 81 affixed to a rock shaft 82 as shown in Fig. 20. The hook 78 opens downwardly and is elongated so as to permit the pin 77 to freely ride in and out of engagement therewith; the hook being normally disposed in position to effect engagement with the pin and remain in such engagement until its release is effected by means of a spring 83 arranged to exert a downward pull on the hook; the spring engaging a rod 84 extending parallel with and connected to the stem 79. As a means for limiting downward movement of the hook under the urge of the spring 83, the rod 84 is extended through an elongated loop 85 projecting upwardly from the end wall of the scraper body; which loop also serves as a guide for movement of the hook and stem. The half-wheels E and F are normally disposed with their peripheral portions extending rearwardly as shown in Fig. 1 and 21, and are maintained in this position while the scraper body is disposed in its normal position, and its scraping and loading position, and being projected upwardly when the scraper is in the dumping position; the half-wheels being turned to present the upper forward end portions thereof to the ground when it is desired to effect restoration of the scraper body to its normal position from its tilted dumping and leveling position. This operation is effected by rocking the rock shaft 82 as will presently be described. The rock shaft 82 extends longitudinally above the scraper body and is supported intermediate its ends in a bearing 86 on the bracket 26, and at its ends in bearings 87 and 88 carried on the bars z projecting above the end walls 22 and 23.

Affixed to the rock shaft is an arm 89 which normally projects rearwardly over and beyond the back wall of the scraper body, to the outer end of which is pivotally connected at 90, a pair of links 91 leading forwardly and pivotally connected at their forward ends at 92 to an operating lever 93. The forward end of the lever 93 is pivoted at 94 to a standard 95 erected from the gusset plate 24 and affixed to the bracket 26; the lever 93 projecting rearwardly and having its outer end connected with a forwardly leading pull cord 96.

A spring 97 extends between the rear wall of the scraper body and the arm 89 and normally maintains the latter in its lowermost position in which position the rock shaft is disposed with the crank arm 81 inclined rearwardly so that the hooks 78 will then be retracted as shown in Fig. 1.

The arm 89, links 91, and lever 93 constitute a toggle which, when folded under the urge of a spring 97 securely locks the scraper body in its normal position against turning on its pivotal connection with the draw bars while the carriage D is held in its advanced position, and also serves to hold the upper portion of the scraper body against rocking forward from the dumping and leveling position (shown in Fig. 13) under the pull imparted thereon through the tongue. This function is attained by reason of the pivotal connection between the links 91 and the lever normally extending in alignment with the pivotal mounting of the lever and the connection of the links to the arm 89.

As a means for bracing the upper margin of the rear wall of the scraper body, and preventing its bending inwardly under the pull directed through the tongue to the intermediate portion thereof, a truss rod 98 is secured at its ends to the scraper end walls adjacent their intersection with the upper end portion of the back wall and is engaged intermediate its ends with a bracket 99 projecting interiorly of the scraper from the inner face of the back wall adjacent the upper margins of the latter as shown in Fig. 9. As a means for strengthening the tongue B, the latter is fitted with a truss rod 100 extending longitudinally on the under side thereof; the truss rod being affixed at its ends on the end portions of the tongue and extending over spacers 101 and 102 seating on the lower bar 33 of the tongue.

In the operation of the invention, when the implement is disposed with the parts arranged as shown in Fig. 1 and being advanced, and with the bottom of the scraper body inclined upwardly, in which position it is maintained by the pawl 55 engaging the keeper 57 on the tongue B, the scraper will slide on the rear portion of its bottom wall. To minimize friction and wear, the under side of the bottom wall of the scraper is provided with reenforcing runner plates 103 as is common in devices of this character. When the parts are thus positioned, the implement may be employed in scooping, dumping and leveling the soil without initially employing the scraping feature, but when it is desired to cause the scraper blade to effect a scraping action, the operating lever 41 is rocked upwardly and forwardly, as by exerting a pull on the cord 43, whereupon the forward edge of the scraper blade is tilted downwardly as before described, and as shown in full lines in Fig. 10.

On advance of the scraper, materials passing over the scraper blade will be collected in the scraper body and will be conveyed forward therewith. When it is desired to dump the contents of the scraper and to level the deposited materials, the bell-crank lever 58 is rocked forwardly, as by exerting a pull on the cord 61, whereupon the pawl 55 will be tripped to release the carriage D as before described, which will relieve the pull on the draw bars 50, 52 and 53 so that the pull on the scraper will be imparted thereto solely through the tongue B, and by virtue of this pulling action being applied to the upper portion of the scraper body through the bracket 26, the upper portion of the scraper will advance relatively to its lower portion and the scraper will rock forwardly until the runners 67 and 68 are presented to and supported upon the ground surface as shown in Fig. 13. In this operation, the lower forward portion of the scraper momentarily comes to rest, which causes the tongue B to advance relatively to the carriage D until the abutment pin 66 is brought against the carriage, whereupon continued forward movement of the tongue will advance the carriage therewith with the carriage in its retracted position. The scraper will then advance on the runners 67 and 68 by pulls applied to the upper edge thereof through the tongue B, and to the lower portion thereof through the draw bars 50, 52 and 53. As before stated, the extent of tilting of the scraper in this operation is governed by the position of the abutment pin 66, and which is varied as occasion may require according to the character of the soil being worked and the rapidity of discharge of the load desired. It will be understood that the pulling action of the tongue B on the upper portion of the scraper will be directed thereto through the bar 37, carriage C and links 30. When the scraper is thus positioned, the scraper blade will be spaced above the supporting runners 67 and 68 so that the dumped materials may pass beneath the scraper blade. As before stated, the height of the scraper blade relatively to the ground when the scraper body is thus disposed may be regulated as occasion may require by adjusting the runners 67 and 68 as indicated in Fig. 4. Where the deposited load of materials is such as to extend above the plane of the then downturned edge of the scraper blade, the latter will effect a leveling action.

When it is desired to restore the scraper to its normal position, the operating lever 93, which then extends upwardly as shown in Fig. 13 and in full lines in Fig. 19, is swung forwardly, as by exerting a pull on the cord 96, as shown in Fig. 18 and in dotted lines in Fig. 19, which operation rotates the rock shaft 82 and causes the crank arms 81 to advance and thereby move the hooks 78 forwardly so as to permit the half-wheels to turn by gravity from the position shown in full lines in Fig. 19 to the position shown in dotted lines. The ends of the wheel rims then presented to the ground being formed to constitute spurs 104, will effect engagement with the ground and accordingly as the scraper advances, the half-wheels will be caused to turn on the trunnions into the position shown in Fig. 22, and by reason of the radius of the half-wheels being of a greater length then the distance between the axis of the trunnions and the supporting faces of the runners 67 and 68, the scraper will be initially elevated, as shown in Fig. 22, to lift the runners and scraper clear of the ground. Continued pull on the scraper body through the tongue will cause the semicircular wheel rims to roll on the ground under this tractive engagement therewith as progressively illustrated in Figs. 22, 23 and 24. During this elevating operation, which occurs while the half-wheels are turning from the position shown in dotted lines in Fig. 19 to the position shown in Fig. 22, the scraper body will be maintained in its dumping position with the carriage D retracted, so that where desired, the scraper blade may be lifted above or merely above a deposited load, as where no leveling action is required, and in which latter event, the restoring operation is or may be effected immediately after the dumping operation.

Because of the peripherial length of the rims of the half-wheels continued turning of the half-wheels from the position shown in Fig. 22 to the position shown in Fig. 23, that is one-fourth of a revolution, the wheels will exert a pull on the scraper body through the trunnions such as to rock the scraper body downwardly and forwardly on its pivotal connection with the rear end of the tongue and thereby restore the scraper to its normal yet slightly elevated position and in so doing, the forward portion of the scraper will be advanced at a faster rate of travel than that of the advancing tongue so as to cause the carriage D to move forwardly on the tongue. This advance of the carriage D is continued during the travel of the wheel rims on the ground and until the wheels turn from the position shown in Fig. 24 to that shown in Fig. 1, whereupon the carriage D will be advanced sufficiently to cause the pawl or hook 55 to reengage the keeper 57. When the half-wheels are turned so that the lower ends thereof pass rearward of the axis of the trunnions, the scraper body will be lowered to its seated position on the ground.

During this restoring operation, on release of the pull on the operating lever 93, the spring 97 will restore this lever and its connections to normal, and as the scraper body swings to normal, the hooks 78 will be positioned to effect reengagement with the pins 77 on the half-wheels. This action is augmented by the lever 93 gravitating to normal on disposing the scraper body in its normal position.

It will be observed that when the scraper body is in its scraping or loading position, the lever 93 will project rearwardly and downwardly in such manner as to render its operation difficult if not impossible by a pull on its operating cord, which minimizes any possibility of the half-wheels being inadvertently released while the scraper is in its scraping or loading position.

While I have shown and described a specific embodiment of my invention, I do not limit myself to the exact details of construction and arrangement shown, but may employ such changes and modifications as occasion may require without departing from the spirit of the invention as defined in and coming within the scope of the appended claims.

I claim:

1. In a ground working mechanism of the character described, a scraper body, a tongue, a connection between the tongue and the upper portion of the scraper body, a carriage slidable longitudinally of the tongue, connections between said carriage and the lower forward portion of the scraper body, trip controlled means for releasably holding the carriage in an advanced position on the tongue, means for limiting retractive movement of the carriage, and means on said scraper body engageable with the ground for automatically effecting advance of said carriage from its retracted to its advanced position.

2. In a ground working mechanism of the character described, a scraper body, a tongue, a connection between the tongue and the upper portion of the scraper body, on which said scraper body is pivoted to swing from a normal to a dumping position and vice versa, a carriage slidable longitudinally of the tongue, connections between said carriage and the lower forward portion of the scraper body, trip controlled means for releasably holding the carriage in an advanced position on the tongue, operable through said connections to hold the scraper body in its normal position, means for limiting retractive movement of the carriage, operable to determine the dumping position of the scraper body, and means on said scraper body engageable with the ground for automatically effecting advance of said carriage from its retracted to its advanced position, to effect restoring of the scraper body from its dumping to its normal position.

3. In a ground working mechanism of the character described, a scraper body, a tongue, a connection between the tongue and the upper portion of the scraper body, on which said scraper body is pivoted to swing from a normal to a dumping position and vice versa, a carriage slidable longitudinally of the tongue, connections between said carriage and the lower forward portion of the scraper body, trip controlled means for releasably holding the carriage in an advanced position on the tongue, operable through said connections to hold the scraper body in its normal position, means for limiting retractive movement of the carriage, operable to determine the dumping position of the scraper body, means on said scraper body engageable with the ground for automatically effecting advance of said carriage from its retracted to its advanced position, to effect restoring of the scraper body from its dumping to its normal position, and means carried by said scraper body for controlling operation of said last named means.

4. In a ground working machine of the character described, a tiltable scraper body, a tongue, connections between the tongue and the upper portion of the scraper body affording a pivotal connection, connections between the lower portion of said scraper body and said tongue for holding the scraper body in an upright position adapted to be operated to permit tilting of the scraper body, and means carried by the scraper body engageable with the ground and operable under the urge of a pull imparted to the scraper body through said tongue to restore the scraper body to an upright position from a tilted position during advance thereof.

5. In a ground working machine of the character described, a tiltable scraper body, a tongue, connections between the tongue and the upper portion of the scraper body affording a pivotal connection, connections between the lower portion of said scraper body and said tongue for holding the scraper body in an upright position adapted to be operated to permit tilting of the scraper body, means carried by the scraper body engageable with the ground and operable under the urge of a pull imparted to the scraper body through said tongue to restore the scraper body to an upright position from a tilted position during advance thereof, and manually operable means controlling said last named means.

6. In a ground working machine of the character described, a tiltable scraper body, a tongue, connections between the tongue and the upper portion of the scraper body affording a pivotal connection, connections between the lower portion of said scraper body and said tongue for holding the scraper body in an upright position adapted to be operated to permit tilting of the scraper body, a pair of segmental wheels pivotally carried on the ends of said scraper body, means for normally holding said wheels with the arcuate tread portion thereof out of engagement with the ground operable to release said wheels to permit the forward end portions thereof to gravitate into contact with the ground when the scraper body is in a tilted position; said wheels being operable on rotating with their tread portions traversing the ground to restore the scraper body from a tilted to an upright position.

7. In a ground working machine of the character described, a tiltable scraper body, a tongue, connections between the tongue and the upper portion of the scraper body affording a pivotal connection, connections between the lower portion of said scraper body and said tongue for holding the scraper body in an upright position adapted to be operated to permit tilting of the scraper body, a pair of segmental wheels pivotally carried on the ends of said scraper body, means for normally holding said wheels with the arcuate tread portion thereof out of engagement with the ground operable to release said wheels to permit the forward end portions thereof to gravitate into contact with the ground when the scraper body is in a tilted position; said wheels being operable on rotating with their tread portions traversing the ground to restore the scraper body from a tilted to an upright position, and manually operable means for controlling the release of said wheels.

8. In a ground working machine of the character described, a tiltable scraper body, a tongue, connections between the tongue and the upper portion of the scraper body affording a pivotal connection, connections between the lower portion of said scraper body and said tongue for holding the scraper body in an upright position adapted to be operated to permit tilting of the scraper body, a pair of segmental wheels revolubly mounted on the ends of said scraper body, a rock shaft carried by the scraper body, means controlled by said rock shaft for normally holding said wheels against rotation with the tread portions thereof clear of the ground, and a manually operable toggle for actuating said rock shaft to release said wheels when the scraper body is in a tilted position; said wheels being operable on release thereof to engage and traverse the ground, and thereby effect restoring of the scraper body from its tilted to its upright position.

9. In a ground working machine of the character described, a scraper body, a tongue, connections between the tongue and the upper end of the scraper body affording a pivotal connection, a carriage movable longitudinally of said tongue, connections between said carriage and the lower forward portion of said scraper body, a pawl affording a connection between said tongue and carriage to hold the latter in a forwardmost position and thereby maintain said scraper body in an upright position, manually controlled means operable through the connection through the tongue and the upper portion of the scraper body to tilt the scraper body while in its upright position to and from a scraping position, manually actuated means independent of said last named means to disengage said pawl whereby said scraper body will rock to a tilted dumping position under the urge of a pull imparted through said tongue, said carriage being movable longitudinally of said tongue on movement of the scraper body to its tilted dumping position, and means for limiting retracted movement of said carriage adjustable to vary the extent of tilt of the scraper body in its dumping position, and manually controlled means engageable with the ground to effect advance of said carriage on said tongue under a pull imparted to said scraper body through said tongue whereby said scraper body will be restored from a tilted to an upright position during advance thereof.

10. In a ground working machine of the character described, a scraper body, a tongue, connections between the tongue and the upper end of the scraper body affording a pivotal connection, a carriage movable longitudinally of said tongue, connections between said carriage and the lower forward portion of said scraper body, a pawl affording a connection between said tongue and carriage to hold the latter in a forwardmost position and thereby maintain said scraper body in an upright position, manually controlled means operable through the connection through the tongue and the upper portion of the scraper body to tilt the scraper body while in its upright position to and from a scraping position, manually actuated means independent of said last named means to disengage said pawl whereby said scraper body will rock to a tilted dumping position under the urge of a pull imparted through said tongue, said carriage being movable longitudinally of said tongue on movement of the scraper body to its tilted dumping position, means for limiting retracted movement of said carriage adjustable to vary the extent of tilt of the scraper body in its dumping position, manually controlled means engageable with the ground to effect advance of said carriage on said tongue under a pull imparted to said scraper body through said tongue whereby said scraper body will be restored from a tilted to an upright position during advance thereof, runners on said scraper body for supporting the latter on the ground in its tilted dumping position, and means for adjustably carrying said runners on said scraper body, whereby the scraper body may be disposed in various spaced relations to the ground when supported on said runners.

In testimony whereof, I have affixed my signature.

JAMES T. COMPTON.